E. MATTMAN.
STATOR COIL SUPPORT.
APPLICATION FILED JAN. 31, 1907.
996,270.
Patented June 27, 1911.
2 SHEETS—SHEET 1.
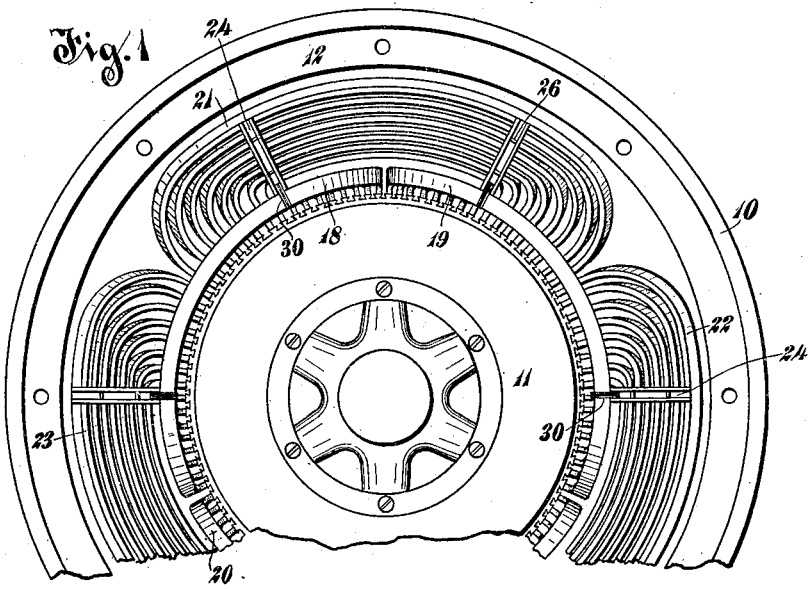
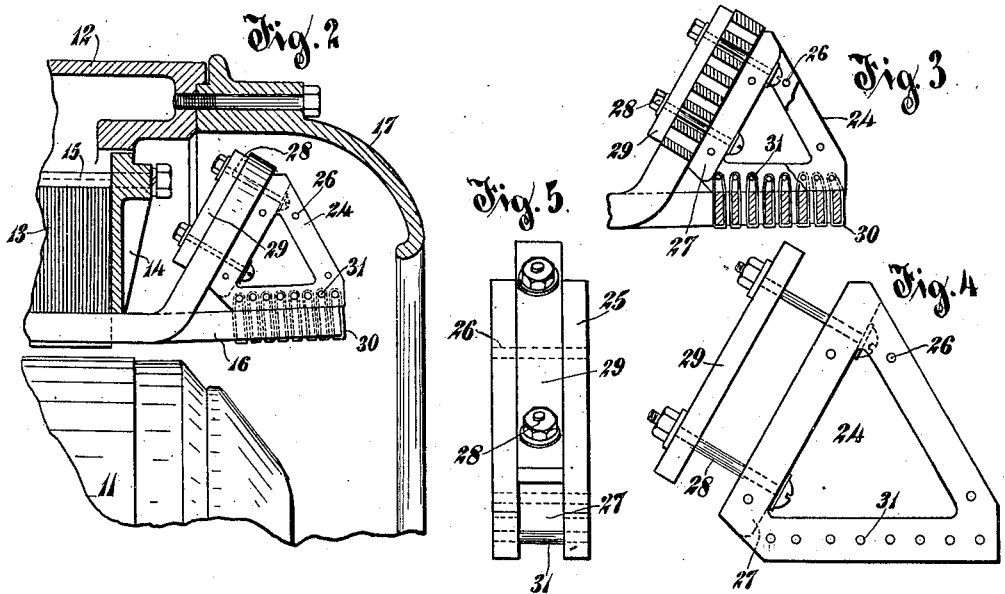
Witnesses
Oliver W. Harman
Fred J. Kinsey
Inventor
Emil Mattman
By Chas. E. Lord
Attorney E. MATTMAN.
STATOR COIL SUPPORT.
APPLICATION FILED JAN. 31, 1907.
996,270.
Patented June 27, 1911.
2 SHEETS—SHEET 2.
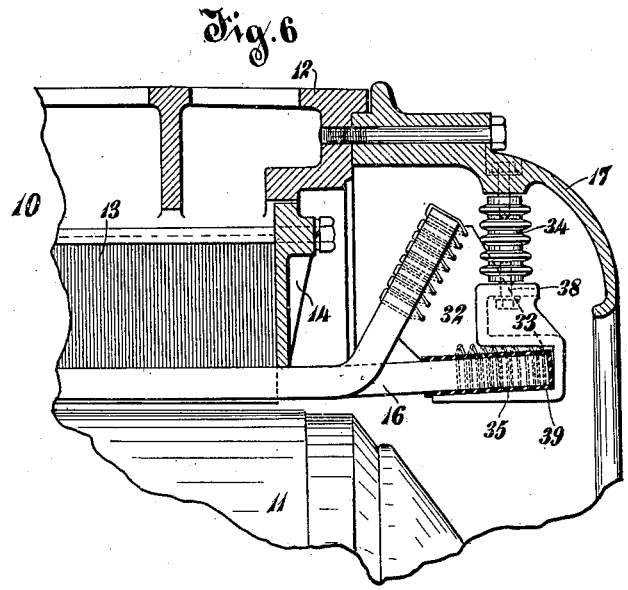
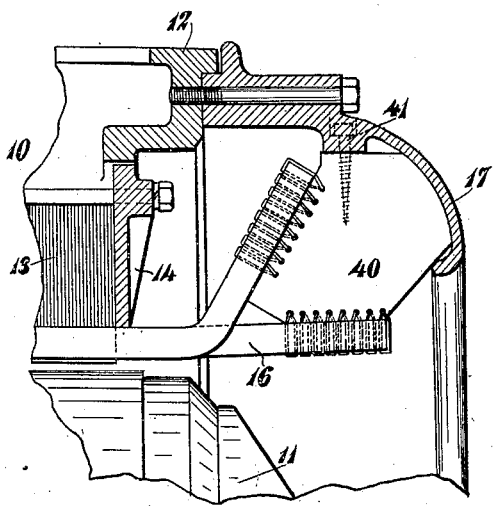
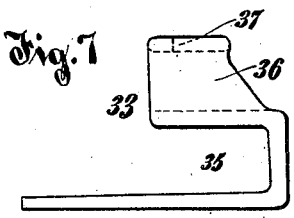
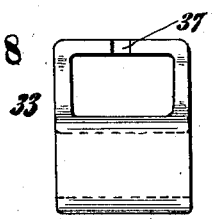

UNITED STATES PATENT OFFICE.

EMIL MATTMAN, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

STATOR-COIL SUPPORT.

996,270.  Specification of Letters Patent.  Patented June 27, 1911.

Application filed January 31, 1907. Serial No. 355,016.

*To all whom it may concern:*

Be it known that I, EMIL MATTMAN, a citizen of the Republic of Switzerland, residing at Norwood, in the county of Hamilton and State of Ohio, have invented certain new and useful Improvements in Stator-Coil Supports, of which the following is a full, clear, and exact specification.

My invention relates to dynamo-electric machines and particularly to the means for supporting and bracing the end-turns of the stator coils.

In large dynamo-electric machines, such as alternating current generators and motors, having coils which extend outward a considerable distance beyond each end of the core, there is considerable vibration in the coils when the machines are in operation if the end turns or portions which project beyond the core are unsupported or unbraced. If this vibration is allowed to continue for a considerable time it may destroy the insulation and cause the winding to be burned out. The degree or severity of vibration in the stator coils depends to a considerable extent upon the type of winding employed and the design of the machine, such as the weight and pitch of the coils. It is particularly severe in the so-called chain winding, especially if groups of coils are used and the pitch of the coils and the number of coils per group are large.

The object of my invention is to provide simple, effective and inexpensive means for bracing and supporting the end-turns or projecting portions of the stator coils, particularly the end-turns of the coils of chain windings, so that the coils will be held firmly in place and the vibration entirely eliminated.

In carrying out my invention, I fasten together the projecting portions of the different coils or group of coils by securing them to the sides of insulating bracing members inserted in the angle between the coils. The mutual bracing action between the coils thus obtained may be sufficient to hold the coils firmly in position. If necessary, however, the coils may be further supported by securing them to the frame of the machine, either by securing the bracing members themselves to the frame or by separate supporting members secured to the coils and frame.

My invention further consists in certain novel details of construction and the combinations and arrangements of parts described in the specification and set forth in the appended claims.

For a better understanding of my invention reference is had to the accompanying drawings in which—

Figure 1 is an end view of a machine equipped with one form of my invention, parts being broken away and removed for the sake of clearness; Fig. 2 is a partial longitudinal section of the same; Fig. 3 is a detail sectional view, parts being broken away; Fig. 4 is a slightly enlarged elevation of a coil bracing means shown in the preceding figures; Fig. 5 is an edge view of the same; Fig. 6 is a partial longitudinal sectional view showing a modification of my invention; Figs. 7 and 8 are slightly enlarged side and end views of a supporting member employed in the construction shown in Fig. 6; and Fig. 9 is a partial longitudinal sectional view showing a further modification.

Referring now to the figures of the drawings 10 represents a stator, and 11 a rotor of a dynamo-electric machine. The stator is provided with a frame or yoke 12 which supports the core 13, the latter consisting of laminæ clamped between end-heads 14, only one of which is shown, by means of bolts 15. The core is slotted in the usual manner for the reception of the conductors of the winding 16. Secured to the ends of the frame and extending over the stator winding are end-housings 17. I have here shown a chain winding consisting of groups of coils, there being one group per pair of poles per phase and each group consisting of a large number of concentric coils, in this instance eight in number. In this case I have shown a three-phase four-pole winding, there being six different groups of coils. The coils of each phase overlap the coils of the other two phases, the end portions of the overlapping groups being arranged at different angles. Thus the end portions or end turn of groups 18, 19 and 20 extend outwardly approximately in line with the conductors in the slots, being bent outward only very slightly, and the end portions or end-turns of groups 21, 22 and 23 are bent outward at a considerable angle to the end portions or end-turns of the groups 18, 19 and 20, and to the conductors in the slots.

It is seen that on account of the number of concentric coils in each group, and on account of the small number of poles and the large pitch of the coils, considerable portions of the coils project outward beyond the core. It is seen that if these projecting portions of the coils were not braced or supported in some manner, they would vibrate to a considerable extent when the machine is operating. To eliminate this vibration I fasten together the end portions of the overlapping groups of coils. This is accomplished by securely fastening the conductors to insulating bracing members 24 in the angles between the groups of coils. In the preferred form of my invention the bracing members consist of frames, triangular in shape, each formed of two parallel, triangular or wedge-shaped insulating side plates 25, spaced apart by connecting pins 26 and a fiber block 27. In this instance the coils 21, 22 and 23, which are bent outward at a considerable angle, are tightly clamped to the frames by bolts 28 and clamping block 29, the bolts 28 passing through the blocks 27 and 29 and between the coils. The coils of the other groups are secured individually to the frames by means of tape or cord 30, which is passed around each coil and around pins 31 extending in a row between the side plates of each frame adjacent the coils, there being in this instance as many pins in each frame as coils in the group. I prefer to secure the coils of at least the groups which extend outward approximately in an axial direction in the manner shown and described, as it has been found by experience that these coils vibrate more than the coils bent outward at a greater angle. If desired, however, the individual coils of all the groups may be bound or tied to the bracing members or all may be clamped thereto by the bolts. Each group of coils may be supported by as many of the bracing members as is necessary. In this instance each group is secured to each of the adjacent overlapping groups by one of the frames. In case the end-turns are not sufficiently supported by the mutual bracing action thus obtained, I may support them further by fastening them to the frame or other stationary support.

In Fig. 6 the overlapping end-turns are secured together and braced by wedge or triangular shaped blocks 32 to two sides of which the coils are secured, in this case being tied or bound thereto, holes being provided for this purpose along the two sides of the block. The coils are further supported by means of castings 33 carried by insulating bushings 34 secured to the frame. Each casting has a U-shaped recess 35 which receives the end-portions of one of the groups of coils 18, 19 and 20 which extend outward axially or substantially in line with the conductors in the slots, and with an extension 36 having a slot 37 to receive a stud 38 on the lower end of one of the bushings 34. These castings 33 are carefully insulated from the coils by insulation 39.

In Fig. 9 I show a further modification. As in the preceding instances, the coils are secured to bracing members 40, the individual coils being tied or bound thereto. The bracing members in this case are of different shape, being longer and fitting closely within the end-members 16, to which they are secured by screws 41.

Thus it is seen that with the constructions shown, the portions of the coils which project beyond the core are well braced and supported, so that undesirable and dangerous vibration is eliminated and the coils are held firmly in position.

I do not desire to be confined to the exact details shown but aim in my claims to cover all modifications which do not depart from the spirit and scope of my invention.

What I claim as new and desire to secure by Letters Patent is:—

1. In a dynamo-electric machine, a stator core and a chain winding consisting of overlapping groups of coils extending outward from the core in different directions, and means for fastening the conductors of each group extending in one direction to the conductors of overlapping groups extending in a different direction whereby mutual bracing action between the coils is secured, and for supporting said coils on the frame.

2. In a dynamo-electric machine, the combination of a core, a winding carried thereby and consisting of a plurality of groups of coils, and means for supporting said coils on the frame of the machine and for securing a mutual bracing action between said groups of coils.

3. In a dynamo-electric machine, the combination of a core, a winding carried thereby and consisting of a plurality of groups of coils, end heads for said machine, and means for supporting said coils on said end heads and for securing a mutual bracing action between said groups of coils.

4. In a dynamo-electric machine, a stator comprising a core and a winding, said winding consisting of groups of coils having end portions extending beyond the core in different directions, and bracing means for the end portions comprising insulating members each securely fastened to the end portions of the two groups of coils and to the frame of said machine.

5. In a dynamo-electric machine, a stator comprising a core and a winding consisting of overlapping groups of concentric coils having end turns extending beyond the core in different directions, and bracing and supporting means for the end turns comprising wedge-shaped insulating members each in engagement with and secured to the conductors of the two groups of coils and also to the frame of the machine.

6. In a dynamo-electric machine, a stator comprising a core and a winding consisting of overlapping groups of concentric coils having end turns extending beyond the core, the end turns of the groups which overlap being bent at angles to one another, and means secured to the frame of the machine and for bracing the end turns, said means comprising insulating members each fitting into the angle between two groups of coils, said coils being fastened to the sides of the members.

7. In a dynamo-electric machine, a stator core, a chain winding consisting of overlapping groups of coils having portions which extend outward from the same end of the core in different directions, and means secured to the frame of the machine for fastening the conductors of each group extending in one direction to the conductors of the two adjacent groups whereby mutual bracing action between said coils is secured.

8. In a dynamo-electric machine, the combination of a core, a winding comprising coils disposed at angles with respect to each other, and a supporting member mutually bracing said coils and fastened to the frame of said machine.

In testimony whereof I affix my signature, in the presence of two witnesses.

EMIL MATTMAN.

Witnesses:
ARTHUR F. KWIS,
FRED J. KINSEY.

---

Copies of this patent may be obtained for five cents each, by addressing the "Commissioner of Patents, Washington, D. C."